(12) United States Patent
Paz et al.

(10) Patent No.: US 11,799,708 B1
(45) Date of Patent: Oct. 24, 2023

(54) LOW PEAK-TO-AVERAGE POWER RATIO DEMODULATION REFERENCE SIGNAL SEQUENCE AND PATTERN

(71) Applicant: QUALCOMM Incorporated, San Diego, CA (US)

(72) Inventors: Daniel Paz, Geva Carmel (IL); Idan Michael Horn, Hod Hasharon (IL); Shay Landis, Hod Hasharon (IL); Michael Levitsky, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/812,630

(22) Filed: Jul. 14, 2022

(51) Int. Cl.
*H04L 27/26* (2006.01)
*H04B 7/0413* (2017.01)
*H04L 5/00* (2006.01)

(52) U.S. Cl.
CPC ....... *H04L 27/2636* (2013.01); *H04B 7/0413* (2013.01); *H04L 5/0023* (2013.01); *H04L 27/2614* (2013.01); *H04L 27/26526* (2021.01)

(58) Field of Classification Search
CPC .. H04L 5/023; H04L 27/2614; H04L 27/2636
See application file for complete search history.

(56) References Cited

U.S. PATENT DOCUMENTS

2019/0200326 A1\* 6/2019 Shin ............... H04L 5/0051

\* cited by examiner

*Primary Examiner* — Rahel Guarino
(74) *Attorney, Agent, or Firm* — Harrity & Harrity LLP

(57) ABSTRACT

Various aspects of the present disclosure generally relate to wireless communication. In some aspects, a user equipment (UE) may determine one or more demodulation reference signal (DMRS) scrambling sequences using a low peak-to-average power ratio (PAPR) sequence generator, each corresponding to a respective port of one or more ports, the one or more ports being associated with a downlink multiple input multiple output (MIMO) communication, wherein the downlink MIMO communication is a discrete Fourier transform spread orthogonal frequency division multiplexing (DFT-s-OFDM)-based communication. The UE may receive the downlink MIMO communication including a DMRS according to an intra-slot DMRS pattern that indicates one or more time domain multiplexed symbols, each being at least partially allocated with at least one DMRS scrambling sequence of the one or more DMRS scrambling sequences. Numerous other aspects are described.

30 Claims, 9 Drawing Sheets

LOW PEAK-TO-AVERAGE POWER RATIO DEMODULATION REFERENCE SIGNAL SEQUENCE AND PATTERN

FIELD OF THE DISCLOSURE

Aspects of the present disclosure generally relate to wireless communication and to techniques and apparatuses for a low peak-to-average power ratio (PAPR) demodulation reference signal (DMRS) sequence and pattern.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
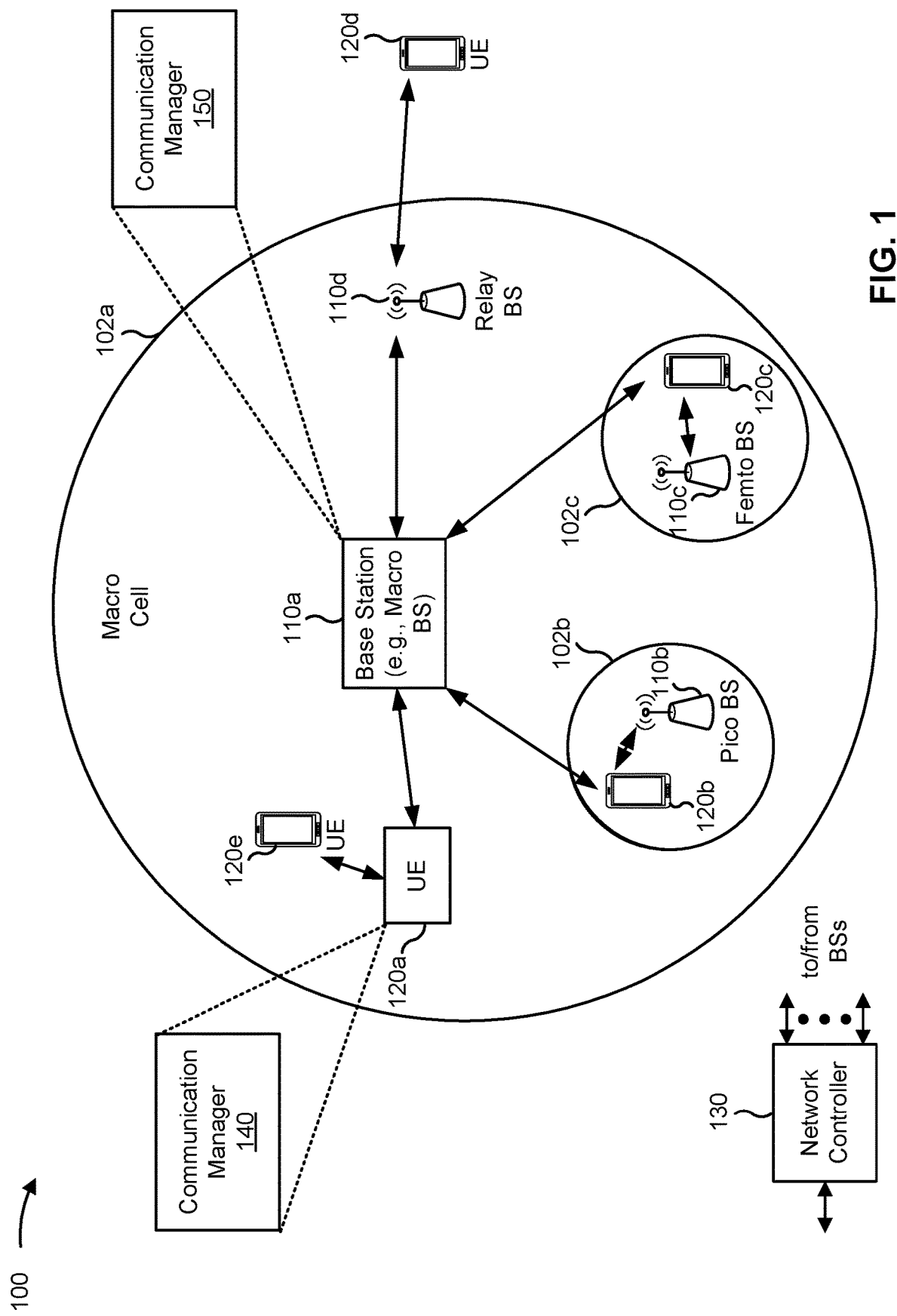
FIG. 1 is a diagram illustrating an example of a wireless network, in accordance with the present disclosure.

Some aspects described herein relate to a method of wireless communication performed by a user equipment (UE). The method may include determining one or more demodulation reference signal (DMRS) scrambling sequences using a low peak-to-average power ratio (PAPR) sequence generator, where each DMRS scrambling sequence of the one or more DMRS scrambling sequences corresponds to a respective port of one or more ports, the one or more ports being associated with a downlink multiple input multiple output (MIMO) communication, where the downlink MIMO communication is a discrete Fourier transform spread orthogonal frequency division multiplexing (DFT-s-OFDM)-based communication. The method may include receiving the downlink MIMO communication including a DMRS according to an intra-slot DMRS pattern, where the intra-slot DMRS pattern indicates one or more time domain multiplexed symbols, each symbol of the one or more time domain multiplexed symbols being at least partially allocated with at least one DMRS scrambling sequence of the one or more DMRS scrambling sequences.

Some aspects described herein relate to a method of wireless communication performed by a network node. The method may include determining one or more DMRS scrambling sequences using a low PAPR sequence generator, where each DMRS scrambling sequence of the one or more DMRS scrambling sequences corresponds to a respective port of one or more ports, the one or more ports being associated with a downlink MIMO communication, where the downlink MIMO communication is a DFT-s-OFDM-based communication. The method may include transmitting the downlink MIMO communication including a DMRS according to an intra-slot DMRS pattern, where the intra-slot DMRS pattern indicates one or more time domain multiplexed symbols, each symbol of the one or more time domain multiplexed symbols being at least partially allocated with at least one DMRS scrambling sequence of the one or more DMRS scrambling sequences.

Some aspects described herein relate to a UE for wireless communication. The UE may include a memory and one or more processors coupled to the memory. The one or more processors may be configured to determine one or more DMRS scrambling sequences using a low PAPR sequence generator, where each DMRS scrambling sequence of the one or more DMRS scrambling sequences corresponds to a respective port of one or more ports, the one or more ports being associated with a downlink MIMO communication, where the downlink MIMO communication is a DFT-s-OFDM-based communication. The one or more processors may be configured to receive the downlink MIMO communication including a DMRS according to an intra-slot DMRS pattern, where the intra-slot DMRS pattern indicates one or more time domain multiplexed symbols, each symbol of the one or more time domain multiplexed symbols being at least partially allocated with at least one DMRS scrambling sequence of the one or more DMRS scrambling sequences.

Some aspects described herein relate to a network node for wireless communication. The network node may include a memory and one or more processors coupled to the memory. The one or more processors may be configured to determine one or more DMRS scrambling sequences using a low PAPR sequence generator, where each DMRS scrambling sequence of the one or more DMRS scrambling sequences corresponds to a respective port of one or more ports, the one or more ports being associated with a downlink MIMO communication, where the downlink MIMO communication is a DFT-s-OFDM-based communication. The one or more processors may be configured to transmit the downlink MIMO communication including a DMRS according to an intra-slot DMRS pattern, where the intra-slot DMRS pattern indicates one or more time domain multiplexed symbols, each symbol of the one or more time domain multiplexed symbols being at least partially allocated with at least one DMRS scrambling sequence of the one or more DMRS scrambling sequences.

Some aspects described herein relate to a non-transitory computer-readable medium that stores a set of instructions for wireless communication by a UE. The set of instructions, when executed by one or more processors of the UE, may cause the UE to determine one or more DMRS scrambling sequences using a low PAPR sequence generator, where each DMRS scrambling sequence of the one or more DMRS scrambling sequences corresponds to a respective port of one or more ports, the one or more ports being associated with a downlink MIMO communication, where the downlink MIMO communication is a DFT-s-OFDM-based communication. The set of instructions, when executed by one or more processors of the UE, may cause the UE to receive the downlink MIMO communication including a DMRS according to an intra-slot DMRS pattern, where the intra-slot DMRS pattern indicates one or more time domain multiplexed symbols, each symbol of the one or more time domain multiplexed symbols being at least partially allocated with at least one DMRS scrambling sequence of the one or more DMRS scrambling sequences.

Some aspects described herein relate to a non-transitory computer-readable medium that stores a set of instructions for wireless communication by a network node. The set of instructions, when executed by one or more processors of the network node, may cause the network node to determine one or more DMRS scrambling sequences using a low PAPR sequence generator, where each DMRS scrambling sequence of the one or more DMRS scrambling sequences corresponds to a respective port of one or more ports, the one or more ports being associated with a downlink MIMO communication, where the downlink MIMO communication is a DFT-s-OFDM-based communication. The set of instructions, when executed by one or more processors of the network node, may cause the network node to transmit the downlink MIMO communication including a DMRS according to an intra-slot DMRS pattern, where the intra-slot DMRS pattern indicates one or more time domain multiplexed symbols, each symbol of the one or more time domain multiplexed symbols being at least partially allocated with at least one DMRS scrambling sequence of the one or more DMRS scrambling sequences.

Some aspects described herein relate to an apparatus for wireless communication. The apparatus may include means for determining one or more DMRS scrambling sequences using a low PAPR sequence generator, where each DMRS scrambling sequence of the one or more DMRS scrambling sequences corresponds to a respective port of one or more ports, the one or more ports being associated with a downlink MIMO communication, where the downlink MIMO communication is a DFT-s-OFDM-based communication. The apparatus may include means for receiving the downlink MIMO communication including a DMRS according to an intra-slot DMRS pattern, where the intra-slot DMRS pattern indicates one or more time domain multiplexed symbols, each symbol of the one or more time domain multiplexed symbols being at least partially allocated with at least one DMRS scrambling sequence of the one or more DMRS scrambling sequences.

Some aspects described herein relate to an apparatus for wireless communication. The apparatus may include means for determining one or more DMRS scrambling sequences using a low PAPR sequence generator, where each DMRS scrambling sequence of the one or more DMRS scrambling sequences corresponds to a respective port of one or more ports, the one or more ports being associated with a downlink MIMO communication, where the downlink MIMO communication is a DFT-s-OFDM-based communication. The apparatus may include means for transmitting the downlink MIMO communication including a DMRS according to an intra-slot DMRS pattern, where the intra-slot DMRS pattern indicates one or more time domain multiplexed symbols, each symbol of the one or more time domain multiplexed symbols being at least partially allocated with at least one DMRS scrambling sequence of the one or more DMRS scrambling sequences.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may determine one or more demodulation reference signal (DMRS) scrambling sequences using a low peak-to-average power ratio (PAPR) sequence generator, wherein each DMRS scrambling sequence of the one or more DMRS scrambling sequences corresponds to a respective port of one or more ports, the one or more ports being associated with a downlink multiple input multiple output (MIMO) communication, wherein the downlink MIMO communication is a discrete Fourier transform spread orthogonal frequency division multiplexing (DFT-s-OFDM)-based communication; and receive the downlink MIMO communication including a DMRS according to an intra-slot DMRS pattern, wherein the intra-slot DMRS pattern indicates one or more time domain multiplexed symbols, each symbol of the one or more time domain multiplexed symbols being at least partially allocated with at least one DMRS scrambling sequence of the one or more DMRS scrambling sequences. Additionally, or alternatively, the communication manager 140 may perform one or more other operations described herein.

In some aspects, the network node may include a communication manager 150. As described in more detail elsewhere herein, the communication manager 150 may determine one or more DMRS scrambling sequences using a low PAPR sequence generator, wherein each DMRS scrambling sequence of the one or more DMRS scrambling sequences corresponds to a respective port of one or more ports, the one or more ports being associated with a downlink MIMO communication, wherein the downlink MIMO communication is a DFT-s-OFDM-based communication; and transmit the downlink MIMO communication including a DMRS according to an intra-slot DMRS pattern, wherein the intra-slot DMRS pattern indicates one or more time domain multiplexed symbols, each symbol of the one or more time domain multiplexed symbols being at least partially allocated with at least one DMRS scrambling sequence of the one or more DMRS scrambling sequences. Additionally, or alternatively, the communication manager 150 may perform one or more other operations described herein.

As indicated above, FIG. 1 is provided as an example. Other examples may differ from what is described with regard to FIG. 1.

Figure 2:
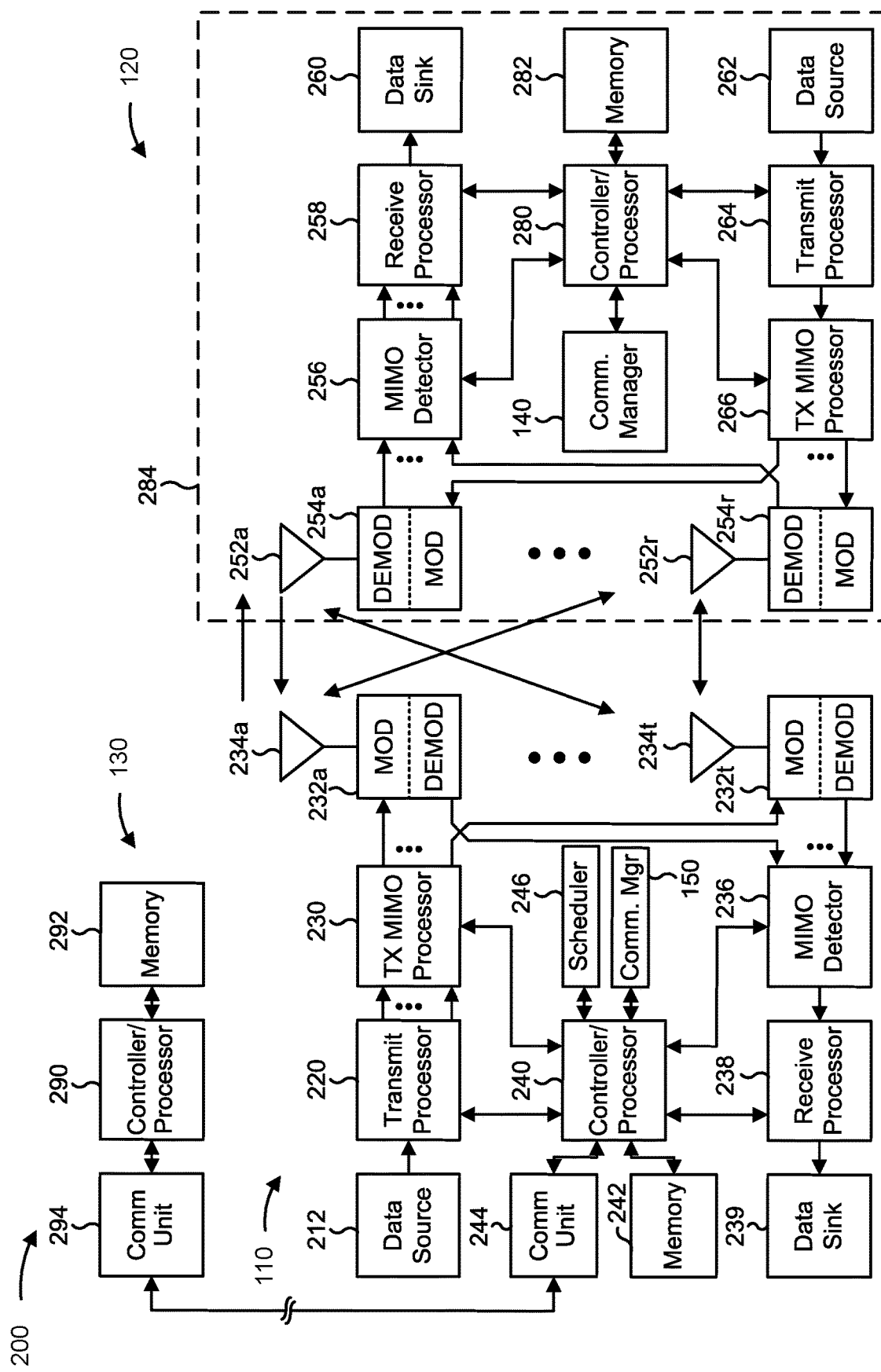
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4A-8).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4A-8).

The controller/processor 240 of the network node 110, the controller/processor 280 of the UE 120, and/or any other component(s) of FIG. 2 may perform one or more techniques associated with a low PAPR DMRS sequence and pattern, as described in more detail elsewhere herein. For example, the controller/processor 240 of the network node 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, a UE (e.g., the UE 120) includes means for determining one or more DMRS scrambling sequences using a low PAPR sequence generator, wherein each DMRS scrambling sequence of the one or more DMRS scrambling sequences corresponds to a respective port of one or more ports, the one or more ports being associated with a downlink MIMO communication, wherein the downlink MIMO communication is a DFT-s-OFDM-based communication; and/or means for receiving the downlink MIMO communication including a DMRS according to an intra-slot DMRS pattern, wherein the intra-slot DMRS pattern indicates one or more time domain multiplexed symbols, each symbol of the one or more time domain multiplexed symbols being at least partially allocated with at least one DMRS scrambling sequence of the one or more DMRS scrambling sequences. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for determining one or more DMRS scrambling sequences using a low PAPR sequence generator, wherein each DMRS scrambling sequence of the one or more DMRS scrambling sequences corresponds to a respective port of one or more ports, the one or more ports being associated with a downlink MIMO communication, wherein the downlink MIMO communication is a DFT-s-OFDM-based communication; and/or means for transmitting the downlink MIMO communication including a DMRS according to an intra-slot DMRS pattern, wherein the intra-slot DMRS pattern indicates one or more time domain multiplexed symbols, each symbol of the one or more time domain multiplexed symbols being at least partially allocated with at least one DMRS scrambling sequence of the one or more DMRS scrambling sequences. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
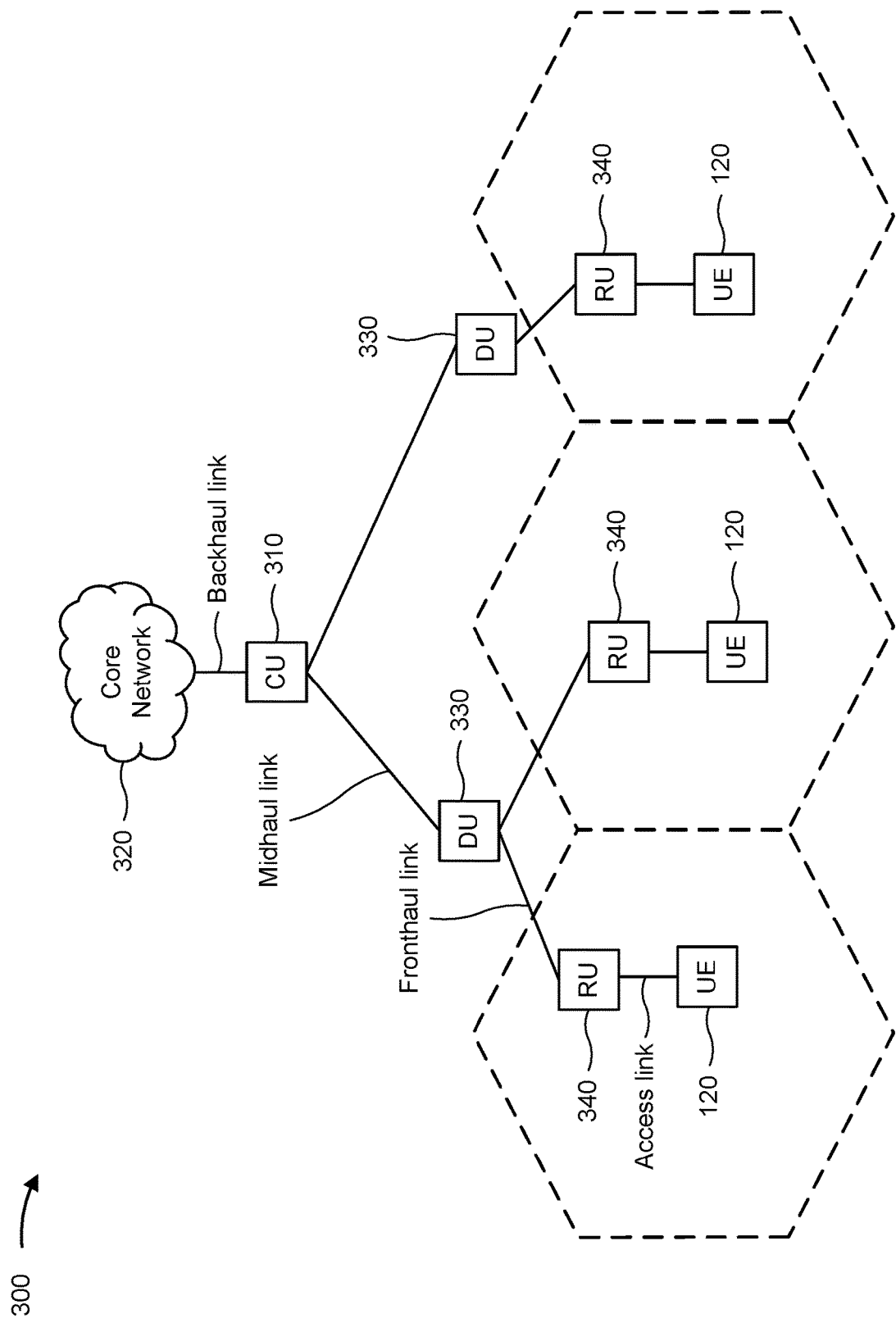
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML, models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

According to some wireless communication standards, an orthogonal frequency division multiplexing (OFDM) waveform is the only configurable waveform that can be used for a downlink data communication, such as a physical downlink shared channel (PDSCH) communication. Notably, some wireless communication standards support the use of a discrete Fourier transform spread OFDM (DFT-s-OFDM)- based waveform (also referred to as transform precoding), but only for uplink communications with a single spatial layer.

Additionally, a demodulation reference signal (DMRS) scrambling sequence to be used for a PDSCH communication may be based on a pseudo-random quadrature phase shift keying (QPSK) sequence, with the scrambling sequence being determined based on an output of a Gold-sequence generator. Such a scrambling sequence is designed such that a peak-to-average power ratio (PAPR) of a DMRS does not exceed a PAPR of data carrying symbols in a downlink communication, with an assumption that an OFDM waveform is used for the downlink communication.

Notably, when operating in a sub-terahertz (sub-THz) band (e.g., a frequency band at or above approximately 52 gigahertz (GHz)), a single carrier waveform, such as DFT-s-OFDM, is advantageous over OFDM for downlink multiple input multiple output (MIMO) communications. One reason that a single carrier waveform is advantageous over OFDM for downlink MIMO communications is that strong phase noise is expected in the sub-THZ band (due to the relatively high carrier-frequency), and the single carrier waveform provides improved phase noise resiliency by allowing a time-domain phase tracking reference signal (PTRS) to be used in order to provide phase noise mitigation. Another reason that a single carrier waveform is advantageous over OFDM for downlink MIMO communications in the sub-Thz band is that a high efficiency power amplifier (PA) design is challenging, and a PA in the sub-THz band suffers from low efficiency and limited linear region. To mitigate this, single carrier waveforms that naturally show lower PAPR characteristics are preferable.

In one illustrative example, the table below shows throughput (TP) gains that can be achieved using a DFT-s-OFDM waveform as compared to an OFDM waveform for different signal-to-noise ratio (SNR) values:

| SNR [dB] | OFDM TP [Gbps] | DFT-s-OFDM TP [Gbps] | TP Gain [%] |
| --- | --- | --- | --- |
| 15 | 47.7 | 57.6 | 22% |
| 20 | 67.5 | 79.9 | 18% |
| 25 | 89.3 | 104.1 | 17% |
| 30 | 103.8 | 122.5 | 18% |
| 35 | 112.4 | 138.8 | 25% |

In this example, a simulation assuming a 4×4 downlink MIMO use case at a carrier frequency of 144 Ghz (and an assumption of a relevant phase noise mask), with a bandwidth of 7.5 GHz and a subcarrier spacing (SCS) of 960 kilohertz (kHz) was used.

However, even when a DFT-s-OFDM waveform could be used for a downlink MIMO communication, a DMRS symbol associated with the downlink MIMO communication would still be OFDM-based. This is required in order to achieve frequency domain equalization that is possible only with an OFDM-based DMRS.

When considering a low PAPR of a DFT-s-OFDM waveform (as compared to the OFDM waveform), a DMRS scrambling sequence that is determined based on a Golden-sequence generator is no longer adequate, as the DMRS symbol may exhibit a higher PAPR than that of the data carrying symbols of the downlink MIMO communication. The severity of this problem increases for wireless communications in the sub-Thz band, where large bandwidths (e.g., in the orders of Ghz) are used to support extreme data rates, which translates to higher PAPR. Given this consideration, DMRS scrambling sequence generation should be adjusted such that the PAPR of the DMRS is equal to or lower than the PAPR of the data carrying symbols in the downlink MIMO communication.

Some techniques and apparatuses described herein enable a low PAPR DMRS sequence and pattern. In some aspects, a wireless communication device (e.g., a UE, a network node, or the like) may determine one or more DMRS scrambling sequences using a low PAPR sequence generator, where each DMRS scrambling sequence corresponds to a respective port of one or more ports associated with a downlink MIMO communication (e.g., a DFT-s-OFDM-based communication). The wireless communication device may then communicate (e.g., receive or transmit) the downlink MIMO communication including a DMRS according to an intra-slot DMRS pattern that indicates one or more time domain multiplexed symbols, each being at least partially allocated with at least one of the one or more DMRS scrambling sequences.

In some aspects, the techniques and apparatuses described herein enable a low PAPR DFT-s-OFDM waveform to be used for a downlink MIMO transmission (e.g., in the sub-Thz band), thereby allowing the increased throughput, range extension, and power efficiency that is afforded by use of the low PAPR DFT-s-OFDM waveform to be realized. For example, a low PAPR DMRS scrambling sequence, as described herein, may cause the PAPR in the one or more DMRS symbols to be approximately equal to or lower than PAPR in data carrying symbols of the downlink MIMO communication, thereby facilitating use of the low PAPR DFT-s-OFDM waveform for the downlink MIMO transmission. Further, the intra-slot DMRS pattern described herein may be utilized to achieve low PAPR in the one or more DMRS symbols, further facilitating the use of the low PAPR DFT-s-OFDM waveform for the downlink MIMO transmission. Additionally, the techniques and apparatuses described herein may enable support for a high number of ports (e.g., more than 12 ports) to be used for downlink MIMO communications. Additional details are provided below.

Figure 4A:
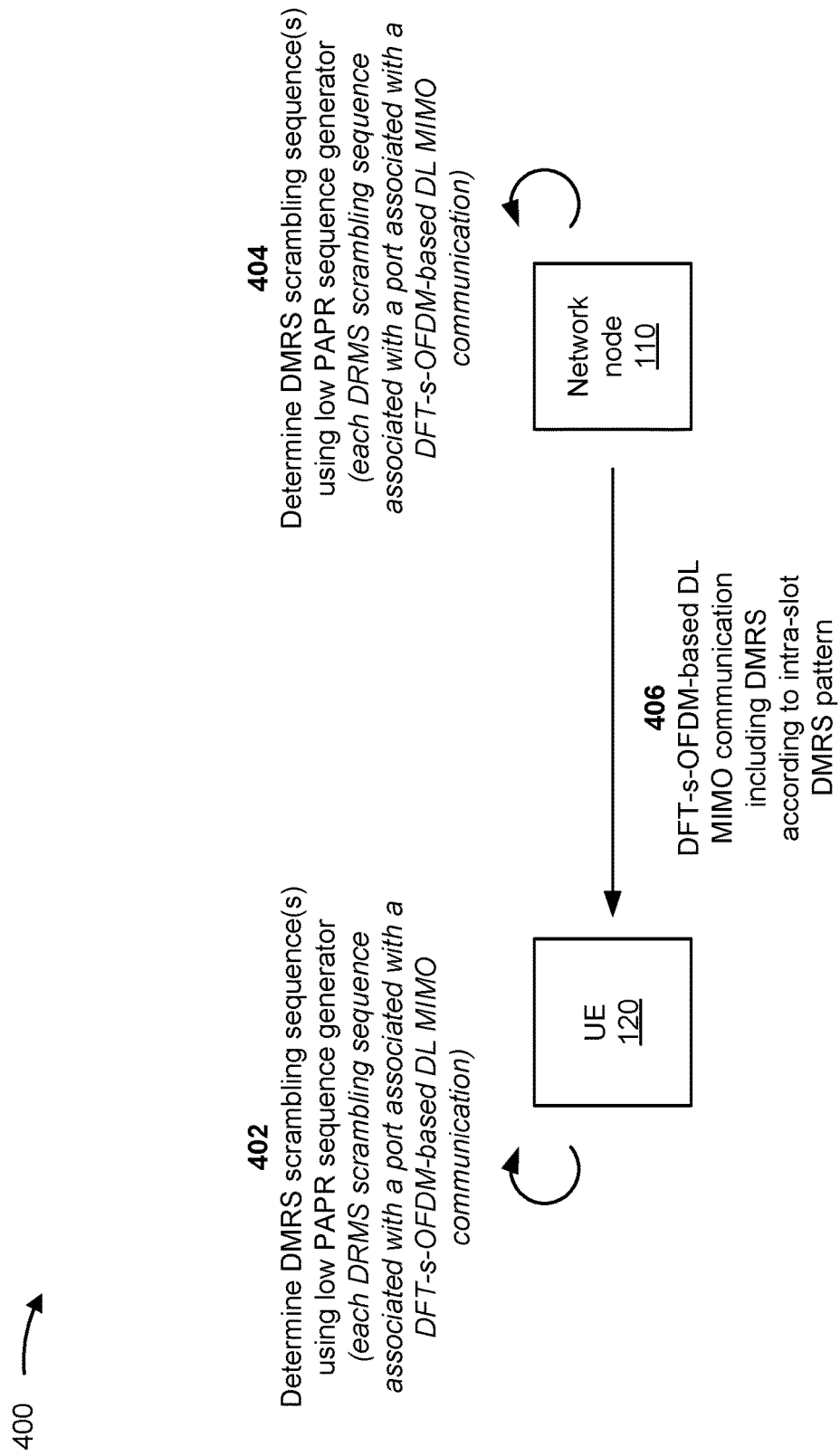
FIGS. 4A and 4B are diagrams of an example associated with a low peak-to-average power ratio (PAPR) demodulation reference signal (DMRS) sequence and pattern, in accordance with the present disclosure.
Figure 4B:
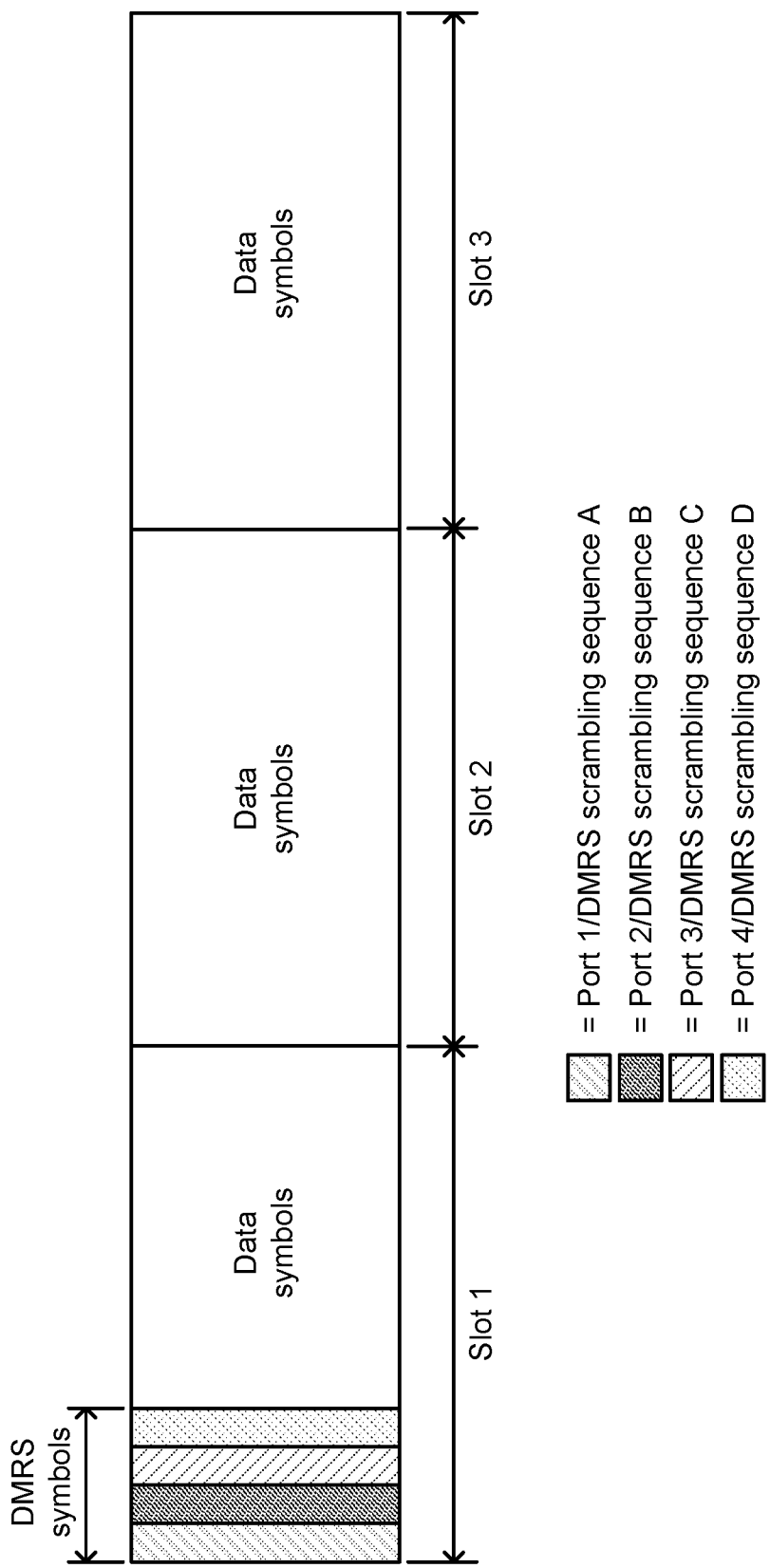

FIGS. 4A and 4B are diagrams of an example 400 associated with a low PAPR DMRS sequence and pattern, in accordance with the present disclosure. As shown in FIG. 4A, example 400 includes communication between a network node 110 and a UE 120. In some aspects, the network node 110 and the UE 120 may be included in a wireless network, such as a wireless network 100. The network node 110 and the UE 120 may communicate via a wireless access link, which may include an uplink and a downlink.

As shown by reference 402, the UE 120 may determine one or more DMRS scrambling sequences using a low PAPR sequence generator. In some aspects, each DMRS scrambling sequence of the one or more DMRS scrambling sequences may correspond to a respective port of one or more ports, where each port of the one or more ports is associated with a downlink MIMO communication. That is, a downlink MIMO communication may be scheduled to be transmitted by the network node 110 and received by the UE 120 via one or more ports. Here, each of the one or more DMRS scrambling sequences determined by the low PAPR sequence generator may correspond to a different port of the one or more ports. In some aspects, the downlink communication is a DFT-s-OFDM-based communication.

In some aspects, the low PAPR sequence generator is a Zadoff-Chu (ZC) sequence generator. That is, in some aspects, the UE 120 is configured with a low PAPR sequence generator configured to generate the one or more DMRS scrambling sequences based on one or more ZC sequences.

Notably, a quantity of ZC sequences that can be generated by the UE 120 is not significantly limited in higher frequency bands (e.g., the sub-THz band) because a required sequence length is relatively large due to a relatively large bandwidth being used for wireless communication in higher frequency bands. Further, relatively high attenuation of wireless communication in the sub-Thz band, along with directivity of transmit beams used for wireless communication, reduces cross-cell inference.

Additionally, ZC sequences are constant amplitude zero autocorrelation waveform (CAZAC) sequences, which hold the property of time domain—frequency domain equivalence, meaning that the inverse DFT of a given ZC sequence results in another scaled ZC sequence. Therefore, the use of ZC sequences can enable extremely low PAPR to be achieved. However, this property does not hold when orthogonal cover codes (OCC) and frequency domain multiplexing (FDM) of multiple sequences (which correspond to different ports) are used in a DMRS symbol to support downlink MIMO communication. In some aspects, this limitation can be mitigated by implementing an intra-slot DMRS pattern in which each DMRS symbol is at least partially allocated with a sequence that corresponds to a single spatial layer (i.e., a single port) and different spatial layers are time domain multiplexed (TDM). In some aspects, such an intra-slot DMRS pattern eliminates a need for OCC and FDM to support multiple ports. Additional details regarding the intra-slot DMRS pattern are described below.

As shown by reference 404, the network node 110 may determine the one or more DMRS scrambling sequences using a low PAPR sequence generator, where each DMRS scrambling sequence corresponds to the respective port of the one or more ports associated with the downlink MIMO communication. In some aspects, the network node 110 may determine the one or more DMRS scrambling sequences in a manner similar to that in which the UE 120 determines the one or more DMRS scrambling sequences, as described herein.

As shown by reference 406, the network node 110 may transmit, and the UE 120 may receive, the downlink MIMO communication including a DMRS according to an intra-slot DMRS pattern. In some aspects, the downlink MIMO communication is communicated (e.g., transmitted by the network node 110 or received by the UE 120) on a frequency that is greater than approximately 52 GHz. For example, in some aspects, the downlink MIMO communication may be communicated in the sub-Thz band.

In some aspects, the intra-slot DMRS pattern indicates one or more time domain multiplexed symbols, where each symbol of the one or more time domain multiplexed symbols is at least partially allocated with at least one DMRS scrambling sequence of the one or more DMRS scrambling sequences. Notably, such an intra-slot DMRS pattern eliminates a need for OCC and FDM to support communication of the downlink MIMO communication using multiple ports. In some aspects, the intra-slot DMRS pattern enables support for communication via a high number of ports (e.g., more than 12 ports). For the sub-Thz case, such a high number of ports may be utilized for, for example, lensed MIMO where each port corresponds to a different beam.

FIG. 4B is a diagram illustrating an example of an intra-slot DMRS pattern that indicates one or more time domain multiplexed symbols, each being at least partially allocated with at least one DMRS scrambling sequence of the one or more DMRS scrambling sequences. In the example shown in FIG. 4B, the intra-slot DMRS pattern is utilized in a first slot (e.g., Slot 1 as identified in FIG. 4B) in a group of slots (e.g., Slots 1 through 3 are shown in FIG. 4B). Here, as shown, the intra-slot DMRS pattern indicates that a first time domain multiplexed symbol (e.g., symbol 0) of the first slot is at least partially allocated with a first DMRS scrambling sequence (e.g., DMRS scrambling sequence A), where the first DMRS scrambling sequence corresponds to a first port (e.g., Port 1) associated with the downlink MIMO communication. The intra-slot DMRS pattern further indicates that a second time domain multiplexed symbol (e.g., symbol 1) of the first slot is at least partially allocated with a second DMRS scrambling sequence (e.g., DMRS scrambling sequence B), where the second DMRS scrambling sequence corresponds to a second port (e.g., Port 2) associated with the downlink MIMO communication. The intra-slot DMRS pattern further indicates that a third time domain multiplexed symbol (e.g., symbol 2) of the first slot is at least partially allocated with a third DMRS scrambling sequence (e.g., DMRS scrambling sequence C), where the third DMRS scrambling sequence corresponds to a third port (e.g., Port 3) associated with the downlink MIMO communication. The intra-slot DMRS pattern further indicates that a fourth time domain multiplexed symbol (e.g., symbol 3) of the first slot is at least partially allocated with a fourth DMRS scrambling sequence (e.g., DMRS scrambling sequence D), where the fourth DMRS scrambling sequence corresponds to a fourth port (e.g., Port 4) associated with the downlink MIMO communication. As shown, other symbols of the first slot (and symbols of Slot 2 and Slot 3) may carry data associated with the downlink MIMO communication. An intra-slot DMRS pattern such as that illustrated in FIG. 4B may cause a PAPR of the symbols carrying DMRS to remain low (e.g., less than or approximately equal to a PAPR of the data carrying symbols), meaning that PAPRs of the DMRS symbols are not a limiting factor for communicating the downlink MIMO communication. Further, the low PAPR achieved in the symbols carrying DMRS using an intra-slot DMRS pattern such as that illustrated in FIG. 4B provide channel estimation processing gains.

In some aspects, the intra-slot DMRS pattern may indicate that a given symbol of the one or more time domain multiplexed symbols is partially allocated with a single DMRS scrambling sequence of the one or more DMRS scrambling sequences. For example, the given symbol may comprise N frequency resources (e.g., subcarriers, resource blocks, or the like), and the intra-slot DMRS pattern may indicate that M (M<N) frequency resources of the N frequency resources are allocated with the single DMRS scrambling sequence. In some aspects, partial allocation of a given symbol with a single DMRS scrambling sequence may provide inter-carrier-interference (ICI) mitigation on the given symbol (e.g., caused by the phase noise impairment) or may improve channel estimation.

Additionally, or alternatively, the intra-slot DMRS pattern may indicate that a given symbol of the one or more time domain multiplexed symbols is fully allocated with a single DMRS scrambling sequence of the one or more DMRS scrambling sequences. For example, the given symbol may comprise N frequency resources, and the intra-slot DMRS pattern may indicate that each of the N frequency resources are allocated with the single DMRS scrambling sequence. In some aspects, full allocation of the given symbol with a single sequence can provide channel estimation processing gain (e.g., due to increased frequency domain resolution). Additionally, full allocation of the given symbol may increase a possible number of sequences that can be used, which facilitates use of the low PAPR sequence generator, as described above.

In some aspects, whether a given symbol is fully allocated or partially allocated may be based at least in part on a dominating impairment associated with the symbol. In some aspects, a determination of whether a given symbol is fully allocated or partially allocated may be independent of such a determination for another symbol (e.g., each symbol may be allocated independently).

In some aspects, partial allocation of symbols carrying DMRS may be performed with different comb factors (e.g., controlling the number of zero power resource elements (REs) between allocated REs) depending on the dominating impairment. In some aspects, the network node 110 may be configured (e.g., according to an applicable wireless communication standard) with a DMRS boosting factor to be applied for full allocation of DMRS symbols, given that each DMRS symbol contains only a single layer (while data carrying symbols of the slot contain all layers). In some aspects, the DMRS boosting factor may be adjusted such that power of the symbols carrying DMRS will be increased (e.g., maximized) under different PAPR values.

In some aspects, the intra-slot DMRS pattern indicates that a symbol of the one or more time domain multiplexed symbols is at least partially allocated with a first DMRS scrambling sequence of the one or more DMRS scrambling sequences and is at least partially allocated with a second DMRS scrambling sequence of the one or more DMRS scrambling sequences. For example, the intra-slot DMRS pattern may indicate that $M_1$ ($M_1 \geq 1$) frequency resources (e.g., subcarriers, resource blocks, or the like) of the given symbol are allocated with a first DMRS scrambling sequence and that $M_2$ ($M_2 \geq 1$) frequency resources (e.g., subcarriers, resource blocks, or the like) of the given symbol are allocated with a second DMRS scrambling sequence, where the given symbol comprises N frequency resources. In this example, a sum of $M_1$ and $M_2$ is less than or equal to N. In some aspects, multiple DMRS scrambling sequences (e.g., two DMRS scrambling sequences), each corresponding to a respective port, can be multiplexed on a given DMRS symbol while still utilizing the intra-slot DMRS pattern described herein in order to, for example, reduce DMRS overhead.

Notably, while the intra-slot DMRS pattern described herein can be utilized for a DFT-s-OFDM-based waveform, the intra-slot DMRS pattern can also be applied to a communication that uses an OFDM waveform (e.g., with a ZC sequence or without a ZC sequence). In some aspects, application of the intra-slot DMRS pattern to an OFDM waveform can lower PAPR in the symbols carrying the DMRS in order to increase channel estimation processing gains.

In some aspects, the network node 110 may transmit, and the UE 120 may receive, a configuration that indicates the intra-slot DMRS pattern. In some aspects, the configuration is communicated (e.g., transmitted or received) via downlink control information (DCI), a medium access control (MAC) control element (CE), or radio resource control (RRC) signaling. In some aspects, the network node 110 may transmit the configuration based at least in part on a determination that a characteristic of a channel associated with the downlink MIMO communication satisfies a threshold. For example, the network node 110 may transmit the configuration for the intra-slot DMRS pattern to the UE 120 based at least in part on a determination that an SNR of a channel associated with the downlink MIMO communication satisfies a threshold. In this way, the network node 110 may (dynamically) adjust the intra-slot pattern (e.g., change a given symbol from a partial allocation to a full allocation, or vice versa) in order to increase throughput, reliability, or the like, of wireless communications.

In some aspects, the network node 110 may transmit, and the UE 120 may receive, the DMRS according to an inter-slot DMRS pattern that indicates one or more slots, of a plurality of slots of the downlink MIMO communication, in which the DMRS is to be received. For example, with reference to FIG. 4B, the inter-slot pattern indicates that the DMRS is communicated in only the first slot of a plurality of slots (e.g., Slot 1, Slot 2, and Slot 3). In some aspects, the inter-slot DMRS pattern indicates that the DMRS is carried in a relatively small quantity of slots in a given plurality of slots (e.g., one out of every eight slots). Such an inter-slot DMRS pattern may be referred to as a sparse inter-slot DMRS pattern. In some aspects, a sparse inter-slot DMRS pattern may result in a reduced PDSCH pilot overhead and an increase in data rate (e.g., as compared to a less sparse inter-slot DMRS pattern). In some aspects, a sparse inter-slot DMRS pattern may be utilized in combination with the intra-slot DMRS pattern described herein to reduce overhead (e.g., despite a quantity of symbols carrying DMRS according to the intra-slot DMRS pattern being greater than a quantity of symbols typically used to carry the DMRS).

In some aspects, a sparse inter-slot DMRS pattern may be suitable for downlink MIMO communication in the sub-THz band since it is expected that UEs 120 using the sub-THz band would be relatively static (e.g., low mobility) and that channels in the sub-THz band would be relatively flat (e.g., due to a low delay spread and strong line-of-sight component).

In some aspects, the network node 110 may transmit, and the UE 120 may receive, a configuration that indicates the inter-slot DMRS pattern. In some aspects, the configuration is communicated (e.g., transmitted or received) via DCI, a MAC-CE, or RRC signaling. In some aspects, the network node 110 may transmit the configuration based at least in part on a determination that a characteristic of a channel associated with the downlink MIMO communication satisfies a threshold. For example, the network node 110 may transmit the configuration for the inter-slot DMRS pattern to the UE 120 based at least in part on a determination that an SNR of a channel associated with the downlink MIMO communication satisfies (e.g., is above or below) a threshold. In this way, the network node 110 may (dynamically) adjust the inter-slot pattern in order to increase throughput, reliability, or the like, of wireless communications.

As indicated above, FIGS. 4A and 4B are provided as examples. Other examples may differ from what is described with respect to FIGS. 4A and 4B.

Figure 5:
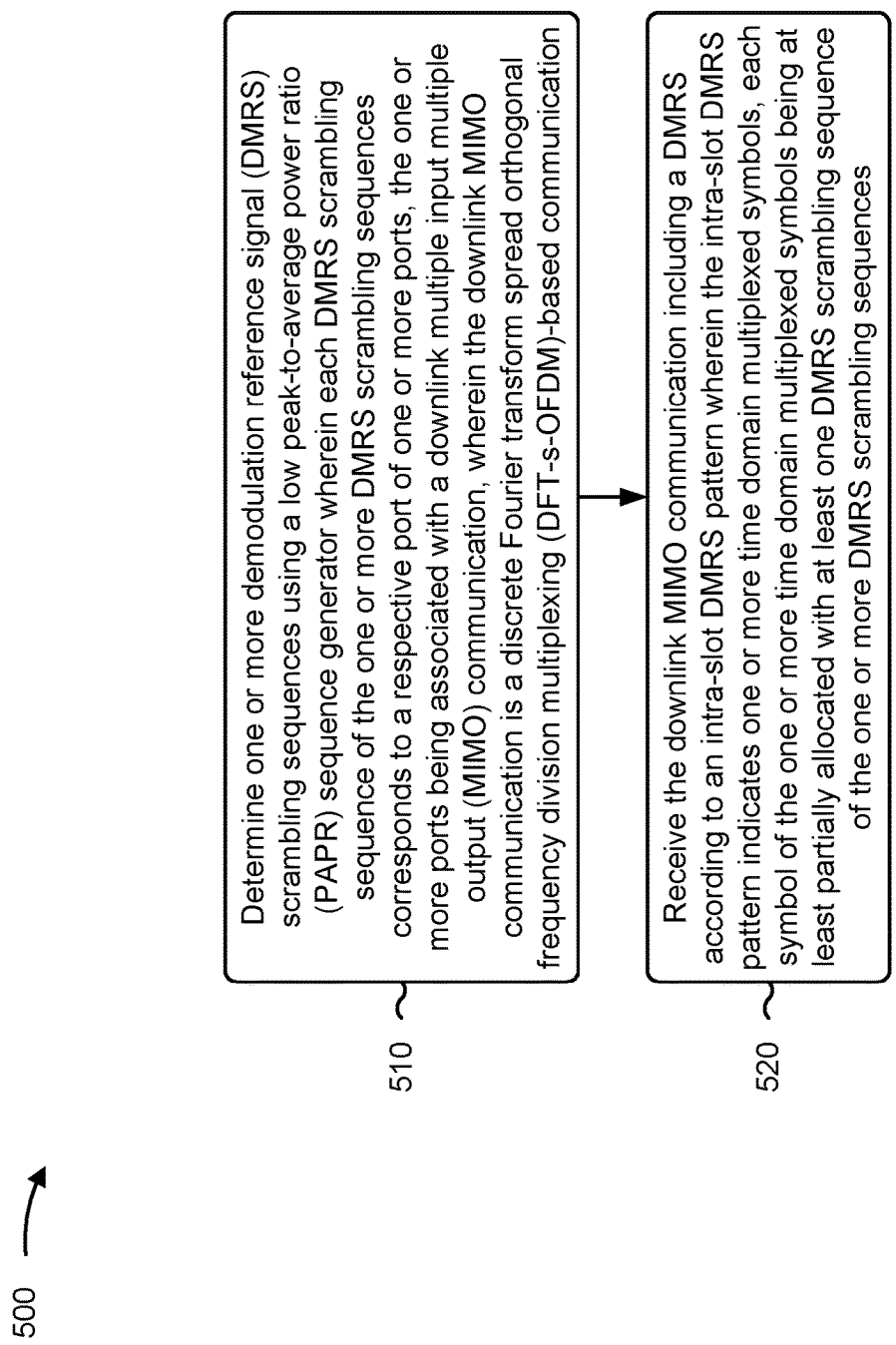
FIG. 5 is a diagram illustrating an example process performed, for example, by a UE, in accordance with the present disclosure.

FIG. 5 is a diagram illustrating an example process 500 performed, for example, by a UE, in accordance with the present disclosure. Example process 500 is an example where the UE (e.g., UE 120) performs operations associated with a low PAPR DMRS sequence and pattern.

As shown in FIG. 5, in some aspects, process 500 may include determining one or more DMRS scrambling sequences using a low PAPR sequence generator, wherein each DMRS scrambling sequence of the one or more DMRS scrambling sequences corresponds to a respective port of one or more ports, the one or more ports being associated with a downlink MIMO communication, wherein the downlink MIMO communication is a DFT-s-OFDM-based communication (block 510). For example, the UE (e.g., using communication manager 140 and/or low PAPR scrambling sequence generator 708, depicted in FIG. 7) may determine one or more DMRS scrambling sequences using a low PAPR sequence generator, wherein each DMRS scrambling sequence of the one or more DMRS scrambling sequences corresponds to a respective port of one or more ports, the one or more ports being associated with a downlink MIMO communication, wherein the downlink MIMO communication is a DFT-s-OFDM-based communication, as described above.

As further shown in FIG. 5, in some aspects, process 500 may include receiving the downlink MIMO communication including a DMRS according to an intra-slot DMRS pattern, wherein the intra-slot DMRS pattern indicates one or more time domain multiplexed symbols, each symbol of the one or more time domain multiplexed symbols being at least partially allocated with at least one DMRS scrambling sequence of the one or more DMRS scrambling sequences (block 520). For example, the UE (e.g., using communication manager 140 and/or reception component 702, depicted in FIG. 7) may receive the downlink MIMO communication including a DMRS according to an intra-slot DMRS pattern, wherein the intra-slot DMRS pattern indicates one or more time domain multiplexed symbols, each symbol of the one or more time domain multiplexed symbols being at least partially allocated with at least one DMRS scrambling sequence of the one or more DMRS scrambling sequences, as described above.

Process 500 may include additional aspects, such as any single aspect or any combination of aspects described below and/or in connection with one or more other processes described elsewhere herein.

In a first aspect, the intra-slot DMRS pattern indicates that a symbol of the one or more time domain multiplexed symbols is partially allocated with a single DMRS scrambling sequence of the one or more DMRS scrambling sequences.

In a second aspect, alone or in combination with the first aspect, the intra-slot DMRS pattern indicates that a symbol of the one or more time domain multiplexed symbols is fully allocated with a single DMRS scrambling sequence of the one or more DMRS scrambling sequences.

In a third aspect, alone or in combination with one or more of the first and second aspects, the intra-slot DMRS pattern indicates that a symbol of the one or more time domain multiplexed symbols is at least partially allocated with a first DMRS scrambling sequence of the one or more DMRS scrambling sequences and is at least partially allocated with a second DMRS scrambling sequence of the one or more DMRS scrambling sequences.

In a fourth aspect, alone or in combination with one or more of the first through third aspects, the low PAPR sequence generator is a Zadoff-Chu sequence generator.

In a fifth aspect, alone or in combination with one or more of the first through fourth aspects, the downlink MIMO communication is received on a frequency that is greater than approximately 52 GHz.

In a sixth aspect, alone or in combination with one or more of the first through fifth aspects, process 500 includes receiving a configuration that indicates the intra-slot DMRS pattern.

In a seventh aspect, alone or in combination with one or more of the first through sixth aspects, the configuration is received via at least one of DCI, a MAC-CE, or RRC signaling.

In an eighth aspect, alone or in combination with one or more of the first through seventh aspects, the DMRS is received according to an inter-slot DMRS pattern that indicates one or more slots, of a plurality of slots of the downlink MIMO communication, in which the DMRS is to be received.

In a ninth aspect, alone or in combination with one or more of the first through eighth aspects, process 500 includes receiving a configuration that indicates the inter-slot DMRS pattern.

In a tenth aspect, alone or in combination with one or more of the first through ninth aspects, the configuration is received via at least one of DCI, a MAC-CE, or RRC signaling.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
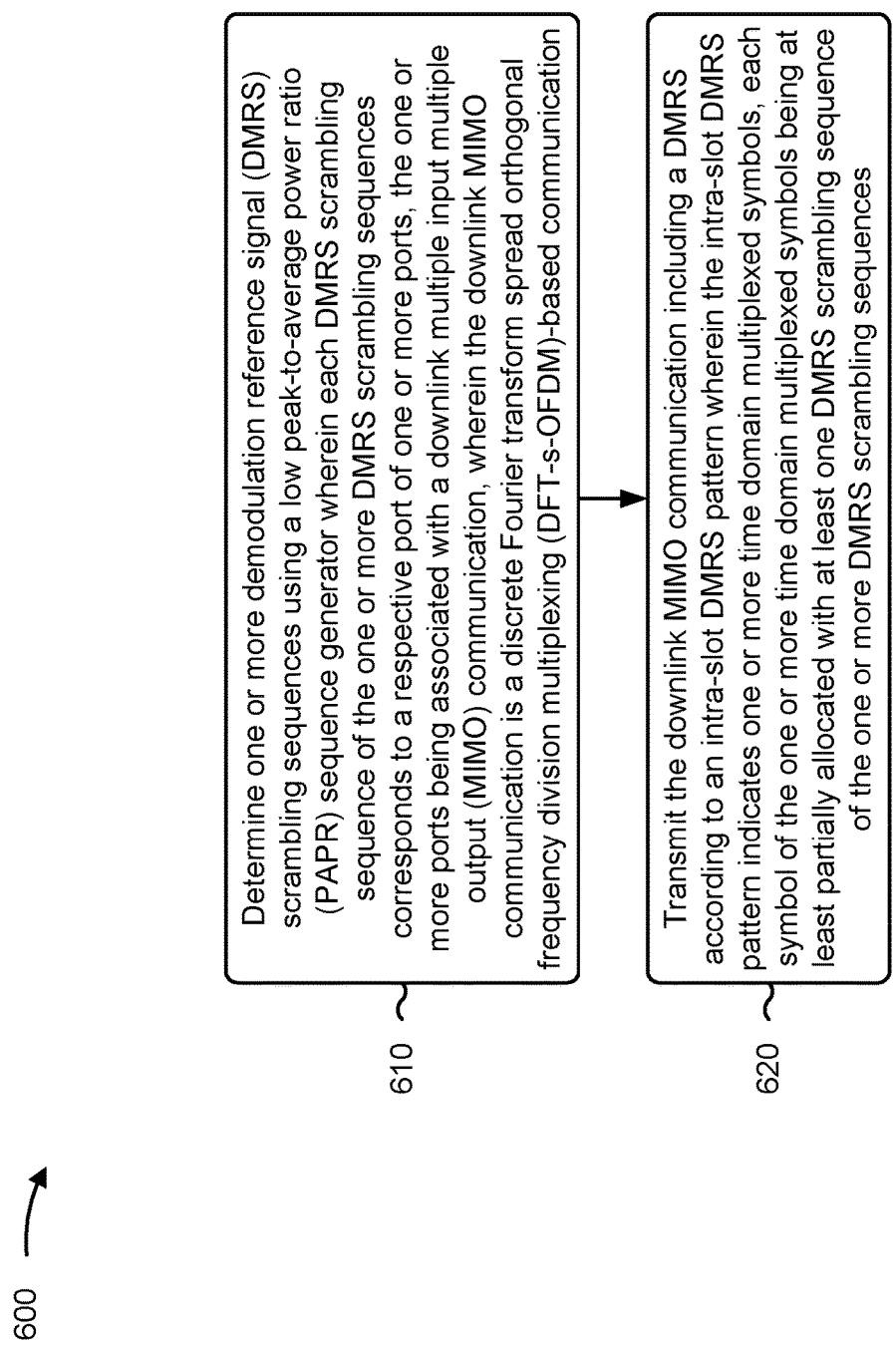
FIG. 6 is a diagram illustrating an example process performed, for example, by a network node, in accordance with the present disclosure.

FIG. 6 is a diagram illustrating an example process 600 performed, for example, by a network node, in accordance with the present disclosure. Example process 600 is an example where the network node (e.g., network node 110) performs operations associated with a low PAPR DMRS sequence and pattern.

As shown in FIG. 6, in some aspects, process 600 may include determining one or more DMRS scrambling sequences using a low PAPR sequence generator, wherein each DMRS scrambling sequence of the one or more DMRS scrambling sequences corresponds to a respective port of one or more ports, the one or more ports being associated with a downlink MIMO communication, wherein the downlink MIMO communication is a DFT-s-OFDM-based communication (block 610). For example, the network node (e.g., using communication manager 150 and/or low PAPR scrambling sequence generator 808, depicted in FIG. 8) may determine one or more DMRS scrambling sequences using a low PAPR sequence generator, wherein each DMRS scrambling sequence of the one or more DMRS scrambling sequences corresponds to a respective port of one or more ports, the one or more ports being associated with a downlink MIMO communication, wherein the downlink MIMO communication is a DFT-s-OFDM-based communication, as described above.

As further shown in FIG. 6, in some aspects, process 600 may include transmitting the downlink MIMO communication including a DMRS according to an intra-slot DMRS pattern, wherein the intra-slot DMRS pattern indicates one or more time domain multiplexed symbols, each symbol of the one or more time domain multiplexed symbols being at least partially allocated with at least one DMRS scrambling sequence of the one or more DMRS scrambling sequences (block 620). For example, the network node (e.g., using communication manager 150 and/or transmission component 804, depicted in FIG. 8) may transmit the downlink MIMO communication including a DMRS according to an intra-slot DMRS pattern, wherein the intra-slot DMRS pattern indicates one or more time domain multiplexed symbols, each symbol of the one or more time domain multiplexed symbols being at least partially allocated with at least one DMRS scrambling sequence of the one or more DMRS scrambling sequences, as described above.

Process 600 may include additional aspects, such as any single aspect or any combination of aspects described below and/or in connection with one or more other processes described elsewhere herein.

In a first aspect, the intra-slot DMRS pattern indicates that a symbol of the one or more time domain multiplexed symbols is at least partially allocated with a single DMRS scrambling sequence of the one or more DMRS scrambling sequences.

In a second aspect, alone or in combination with the first aspect, the intra-slot DMRS pattern indicates that a symbol of the one or more time domain multiplexed symbols is fully allocated with a single DMRS scrambling sequence of the one or more DMRS scrambling sequences.

In a third aspect, alone or in combination with one or more of the first and second aspects, the intra-slot DMRS pattern indicates that a symbol of the one or more time domain multiplexed symbols is at least partially allocated with a first DMRS scrambling sequence of the one or more DMRS scrambling sequences and is at least partially allocated with a second DMRS scrambling sequence of the one or more DMRS scrambling sequences.

In a fourth aspect, alone or in combination with one or more of the first through third aspects, the low PAPR sequence generator is a Zadoff-Chu sequence generator.

In a fifth aspect, alone or in combination with one or more of the first through fourth aspects, the downlink MIMO communication is transmitted on a frequency that is greater than approximately 52 GHz.

In a sixth aspect, alone or in combination with one or more of the first through fifth aspects, process 600 includes transmitting a configuration that indicates the intra-slot DMRS pattern.

In a seventh aspect, alone or in combination with one or more of the first through sixth aspects, the configuration is transmitted via at least one of DCI, a MAC-CE, or RRC signaling.

In an eighth aspect, alone or in combination with one or more of the first through seventh aspects, process 600 includes transmitting the configuration based at least in part on a determination that a characteristic of a channel associated with the downlink MIMO communication satisfies a threshold.

In a ninth aspect, alone or in combination with one or more of the first through eighth aspects, the DMRS is transmitted according to an inter-slot DMRS pattern that indicates one or more slots, of a plurality of slots of the downlink MIMO communication, in which the DMRS is to be transmitted.

In a tenth aspect, alone or in combination with one or more of the first through ninth aspects, process 600 includes transmitting a configuration that indicates the inter-slot DMRS pattern.

In an eleventh aspect, alone or in combination with one or more of the first through tenth aspects, the configuration is transmitted via at least one of DCI, a MAC-CE, or RRC signaling.

In a twelfth aspect, alone or in combination with one or more of the first through eleventh aspects, process 600 includes transmitting the configuration based at least in part on a determination that a characteristic of a channel associated with the downlink MIMO communication satisfies a threshold.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
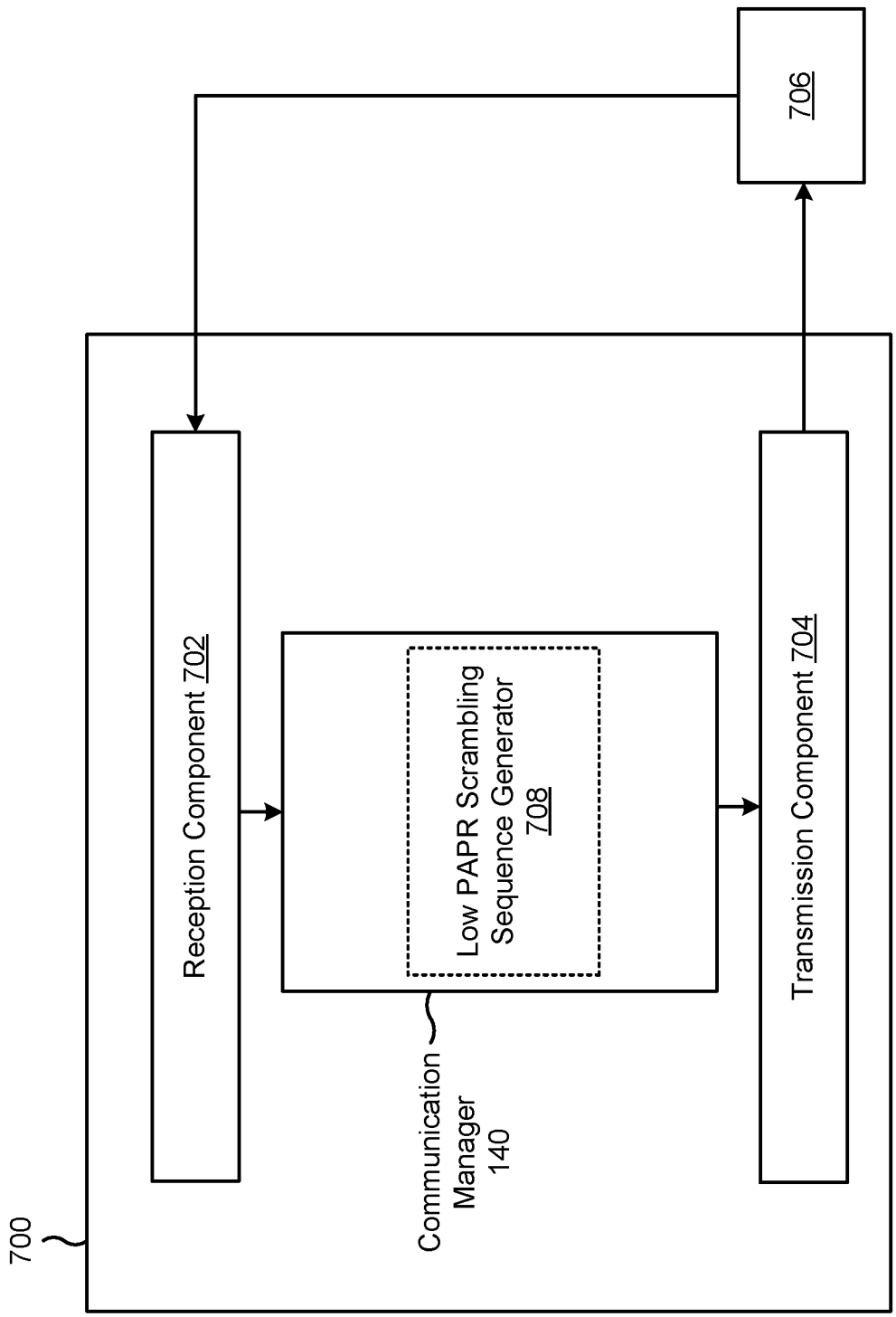
FIG. 7 is a diagram of an example apparatus for wireless communication, in accordance with the present disclosure.

FIG. 7 is a diagram of an example apparatus 700 for wireless communication, in accordance with the present disclosure. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include a low PAPR scrambling sequence generator 708, among other examples.

In some aspects, the apparatus 700 may be configured to perform one or more operations described herein in connection with FIGS. 4A and 4B. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The low PAPR scrambling sequence generator 708 may determine one or more DMRS scrambling sequences using a low PAPR sequence generator, wherein each DMRS scrambling sequence of the one or more DMRS scrambling sequences corresponds to a respective port of one or more ports, the one or more ports being associated with a downlink MIMO communication, wherein the downlink MIMO communication is a DFT-s-OFDM)-based communication. The reception component 702 may receive the downlink MIMO communication including a DMRS according to an intra-slot DMRS pattern, wherein the intra-slot DMRS pattern indicates one or more time domain multiplexed symbols, each symbol of the one or more time domain multiplexed symbols being at least partially allocated with at least one DMRS scrambling sequence of the one or more DMRS scrambling sequences.

The reception component 702 may receive a configuration that indicates the intra-slot DMRS pattern.

The reception component 702 may receive a configuration that indicates the inter-slot DMRS pattern.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
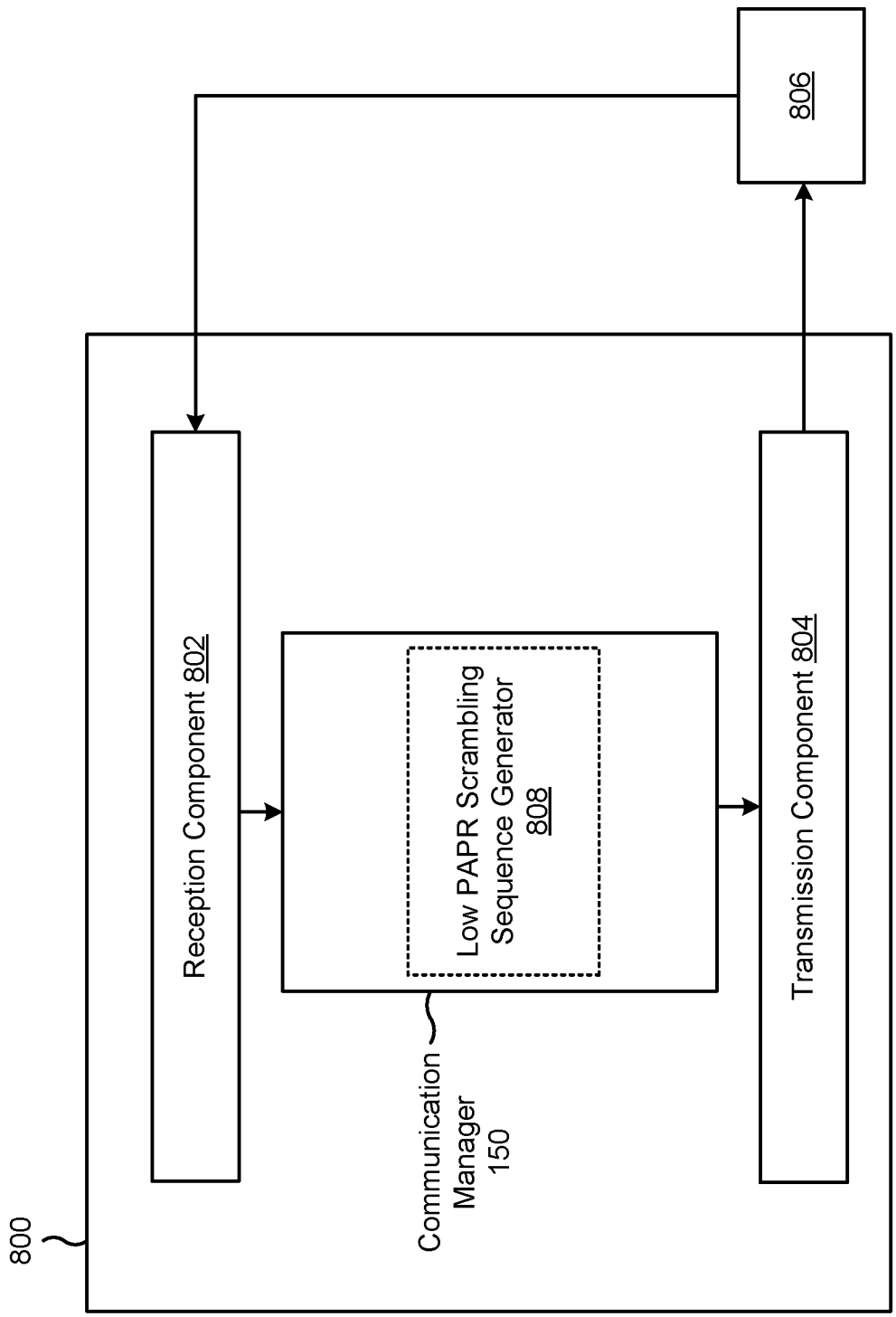
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a network node, or a network node may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150. The communication manager 150 may include a low PAPR scrambling sequence generator 808, among other examples.

In some aspects, the apparatus 800 may be configured to perform one or more operations described herein in connection with FIGS. 4A and 4B. Additionally, or alternatively, the apparatus 800 may be configured to perform one or more processes described herein, such as process 600 of FIG. 6. In some aspects, the apparatus 800 and/or one or more components shown in FIG. 8 may include one or more components of the network node described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the network node described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the network node described in connection with FIG. 2. In some aspects, the transmission component 804 may be co-located with the reception component 802 in a transceiver.

The low PAPR scrambling sequence generator 808 may determine one or more DMRS scrambling sequences using a low PAPR sequence generator, wherein each DMRS scrambling sequence of the one or more DMRS scrambling sequences corresponds to a respective port of one or more ports, the one or more ports being associated with a downlink MIMO communication, wherein the downlink MIMO communication is a DFT-s-OFDM-based communication. The transmission component 804 may transmit the downlink MIMO communication including a DMRS according to an intra-slot DMRS pattern, wherein the intra-slot DMRS pattern indicates one or more time domain multiplexed symbols, each symbol of the one or more time domain multiplexed symbols being at least partially allocated with at least one DMRS scrambling sequence of the one or more DMRS scrambling sequences.

The transmission component 804 may transmit a configuration that indicates the intra-slot DMRS pattern.

The transmission component 804 may transmit the configuration based at least in part on a determination that a characteristic of a channel associated with the downlink MIMO communication satisfies a threshold.

The transmission component 804 may transmit a configuration that indicates the inter-slot DMRS pattern.

The transmission component 804 may transmit the configuration based at least in part on a determination that a characteristic of a channel associated with the downlink MIMO communication satisfies a threshold.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a UE, comprising: determining one or more DMRS scrambling sequences using a low PAPR sequence generator, wherein each DMRS scrambling sequence of the one or more DMRS scrambling sequences corresponds to a respective port of one or more ports, the one or more ports being associated with a downlink MIMO communication, wherein the downlink MIMO communication is a DFT-s-OFDM-based communication; and receiving the downlink MIMO communication including a DMRS according to an intra-slot DMRS pattern, wherein the intra-slot DMRS pattern indicates one or more time domain multiplexed symbols, each symbol of the one or more time domain multiplexed symbols being at least partially allocated with at least one DMRS scrambling sequence of the one or more DMRS scrambling sequences.

Aspect 2: The method of Aspect 1, wherein the intra-slot DMRS pattern indicates that a symbol of the one or more time domain multiplexed symbols is partially allocated with a single DMRS scrambling sequence of the one or more DMRS scrambling sequences.

Aspect 3: The method of any of Aspects 1-2, wherein the intra-slot DMRS pattern indicates that a symbol of the one or more time domain multiplexed symbols is fully allocated with a single DMRS scrambling sequence of the one or more DMRS scrambling sequences.

Aspect 4: The method of any of Aspects 1-3, wherein the intra-slot DMRS pattern indicates that a symbol of the one or more time domain multiplexed symbols is at least partially allocated with a first DMRS scrambling sequence of the one or more DMRS scrambling sequences and is at least partially allocated with a second DMRS scrambling sequence of the one or more DMRS scrambling sequences.

Aspect 5: The method of any of Aspects 1-4, wherein the low PAPR sequence generator is a Zadoff-Chu sequence generator.

Aspect 6: The method of any of Aspects 1-5, wherein the downlink MIMO communication is received on a frequency that is greater than approximately 52 GHz.

Aspect 7: The method of any of Aspects 1-6, further comprising receiving a configuration that indicates the intra-slot DMRS pattern.

Aspect 8: The method of Aspect 7, wherein the configuration is received via at least one of DCI, a MAC-CE, or RRC signaling.

Aspect 9: The method of any of Aspects 1-8, wherein the DMRS is received according to an inter-slot DMRS pattern that indicates one or more slots, of a plurality of slots of the downlink MIMO communication, in which the DMRS is to be received.

Aspect 10: The method of Aspect 9, further comprising receiving a configuration that indicates the inter-slot DMRS pattern.

Aspect 11: The method of Aspect 10, wherein the configuration is received via at least one of DCI, a MAC-CE, or RRC signaling.

Aspect 12: A method of wireless communication performed by a network node, comprising: determining one or more DMRS scrambling sequences using a low PAPR sequence generator, wherein each DMRS scrambling sequence of the one or more DMRS scrambling sequences corresponds to a respective port of one or more ports, the one or more ports being associated with a downlink MIMO communication, wherein the downlink MIMO communication is a DFT-s-OFDM-based communication; and transmitting the downlink MIMO communication including a DMRS according to an intra-slot DMRS pattern, wherein the intra-slot DMRS pattern indicates one or more time domain multiplexed symbols, each symbol of the one or more time domain multiplexed symbols being at least partially allocated with at least one DMRS scrambling sequence of the one or more DMRS scrambling sequences.

Aspect 13: The method of Aspect 12, wherein the intra-slot DMRS pattern indicates that a symbol of the one or more time domain multiplexed symbols is at least partially allocated with a single DMRS scrambling sequence of the one or more DMRS scrambling sequences.

Aspect 14: The method of any of Aspects 12-13, wherein the intra-slot DMRS pattern indicates that a symbol of the one or more time domain multiplexed symbols is fully allocated with a single DMRS scrambling sequence of the one or more DMRS scrambling sequences.

Aspect 15: The method of any of Aspects 12-14, wherein the intra-slot DMRS pattern indicates that a symbol of the one or more time domain multiplexed symbols is at least partially allocated with a first DMRS scrambling sequence of the one or more DMRS scrambling sequences and is at least partially allocated with a second DMRS scrambling sequence of the one or more DMRS scrambling sequences.

Aspect 16: The method of any of Aspects 12-15, wherein the low PAPR sequence generator is a Zadoff-Chu sequence generator.

Aspect 17: The method of any of Aspects 12-16, wherein the downlink MIMO communication is transmitted on a frequency that is greater than approximately 52 GHz.

Aspect 18: The method of any of Aspects 12-17, further comprising transmitting a configuration that indicates the intra-slot DMRS pattern.

Aspect 19: The method of Aspect 18, wherein the configuration is transmitted via at least one of DCI, a MAC-CE, or RRC signaling.

Aspect 20: The method of any of Aspects 18-19, further comprising transmitting the configuration based at least in part on a determination that a characteristic of a channel associated with the downlink MIMO communication satisfies a threshold.

Aspect 21: The method of any of Aspects 12-20, wherein the DMRS is transmitted according to an inter-slot DMRS pattern that indicates one or more slots, of a plurality of slots of the downlink MIMO communication, in which the DMRS is to be transmitted.

Aspect 22: The method of Aspect 21, further comprising transmitting a configuration that indicates the inter-slot DMRS pattern.

Aspect 23: The method of Aspect 22, wherein the configuration is transmitted via at least one of DCI, a MAC-CE, or RRC signaling.

Aspect 24: The method of any of Aspects 22-23, further comprising transmitting the configuration based at least in part on a determination that a characteristic of a channel associated with the downlink MIMO communication satisfies a threshold.

Aspect 25: An apparatus for wireless communication at a device, comprising a processor; memory coupled with the processor; and instructions stored in the memory and executable by the processor to cause the apparatus to perform the method of one or more of Aspects 1-11.

Aspect 26: A device for wireless communication, comprising a memory and one or more processors coupled to the memory, the one or more processors configured to perform the method of one or more of Aspects 1-11.

Aspect 27: An apparatus for wireless communication, comprising at least one means for performing the method of one or more of Aspects 1-11.

Aspect 28: A non-transitory computer-readable medium storing code for wireless communication, the code comprising instructions executable by a processor to perform the method of one or more of Aspects 1-11.

Aspect 29: A non-transitory computer-readable medium storing a set of instructions for wireless communication, the set of instructions comprising one or more instructions that, when executed by one or more processors of a device, cause the device to perform the method of one or more of Aspects 1-11.

Aspect 30: An apparatus for wireless communication at a device, comprising a processor; memory coupled with the processor; and instructions stored in the memory and executable by the processor to cause the apparatus to perform the method of one or more of Aspects 12-24.

Aspect 31: A device for wireless communication, comprising a memory and one or more processors coupled to the memory, the one or more processors configured to perform the method of one or more of Aspects 12-24.

Aspect 32: An apparatus for wireless communication, comprising at least one means for performing the method of one or more of Aspects 12-24.

Aspect 33: A non-transitory computer-readable medium storing code for wireless communication, the code comprising instructions executable by a processor to perform the method of one or more of Aspects 12-24.

Aspect 34: A non-transitory computer-readable medium storing a set of instructions for wireless communication, the set of instructions comprising one or more instructions that, when executed by one or more processors of a device, cause the device to perform the method of one or more of Aspects 12-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
determine one or more demodulation reference signal (DMRS) scrambling sequences using a low peak-to-average power ratio (PAPR) sequence generator,
wherein each DMRS scrambling sequence of the one or more DMRS scrambling sequences corresponds to a respective port of one or more ports, the one or more ports being associated with a downlink multiple input multiple output (MIMO) communication,
wherein the downlink MIMO communication is a discrete Fourier transform spread orthogonal frequency division multiplexing (DFT-s-OFDM)-based communication; and
receive the downlink MIMO communication including a DMRS according to an intra-slot DMRS pattern,
wherein the intra-slot DMRS pattern indicates one or more time domain multiplexed symbols, each symbol of the one or more time domain multiplexed symbols being at least partially allocated with at least one DMRS scrambling sequence of the one or more DMRS scrambling sequences.

2. The UE of claim 1, wherein the intra-slot DMRS pattern indicates that a symbol of the one or more time domain multiplexed symbols is partially allocated with a single DMRS scrambling sequence of the one or more DMRS scrambling sequences.

3. The UE of claim 1, wherein the intra-slot DMRS pattern indicates that a symbol of the one or more time domain multiplexed symbols is fully allocated with a single DMRS scrambling sequence of the one or more DMRS scrambling sequences.

4. The UE of claim 1, wherein the intra-slot DMRS pattern indicates that a symbol of the one or more time domain multiplexed symbols is at least partially allocated with a first DMRS scrambling sequence of the one or more DMRS scrambling sequences and is at least partially allocated with a second DMRS scrambling sequence of the one or more DMRS scrambling sequences.

5. The UE of claim 1, wherein the low PAPR sequence generator is a Zadoff-Chu sequence generator.

6. The UE of claim 1, wherein the downlink MIMO communication is received on a frequency that is greater than approximately 52 gigahertz (GHz).

7. The UE of claim 1, wherein the one or more processors are further configured to receive a configuration that indicates the intra-slot DMRS pattern.

8. The UE of claim 7, wherein the configuration is received via at least one of downlink control information (DCI), a medium access control (MAC) control element (CE), or radio resource control (RRC) signaling.

9. The UE of claim 1, wherein the DMRS is received according to an inter-slot DMRS pattern that indicates one or more slots, of a plurality of slots of the downlink MIMO communication, in which the DMRS is to be received.

10. The UE of claim 9, wherein the one or more processors are further configured to receive a configuration that indicates the inter-slot DMRS pattern.

11. The UE of claim 10, wherein the configuration is received via at least one of downlink control information (DCI), a medium access control (MAC) control element (CE), or radio resource control (RRC) signaling.

12. A network node for wireless communication, comprising:
a memory; and
one or more processors, coupled to the memory, configured to:
determine one or more demodulation reference signal (DMRS) scrambling sequences using a low peak-to-average power ratio (PAPR) sequence generator,
wherein each DMRS scrambling sequence of the one or more DMRS scrambling sequences corresponds to a respective port of one or more ports, the one or more ports being associated with a downlink multiple input multiple output (MIMO) communication,
wherein the downlink MIMO communication is a discrete Fourier transform spread orthogonal frequency division multiplexing (DFT-s-OFDM)-based communication; and
transmit the downlink MIMO communication including a DMRS according to an intra-slot DMRS pattern,
wherein the intra-slot DMRS pattern indicates one or more time domain multiplexed symbols, each symbol of the one or more time domain multiplexed symbols being at least partially allocated with at least one DMRS scrambling sequence of the one or more DMRS scrambling sequences.

13. The network node of claim 12, wherein the intra-slot DMRS pattern indicates that a symbol of the one or more time domain multiplexed symbols is at least partially allocated with a single DMRS scrambling sequence of the one or more DMRS scrambling sequences.

14. The network node of claim 12, wherein the intra-slot DMRS pattern indicates that a symbol of the one or more time domain multiplexed symbols is fully allocated with a single DMRS scrambling sequence of the one or more DMRS scrambling sequences.

15. The network node of claim 12, wherein the intra-slot DMRS pattern indicates that a symbol of the one or more time domain multiplexed symbols is at least partially allocated with a first DMRS scrambling sequence of the one or more DMRS scrambling sequences and is at least partially allocated with a second DMRS scrambling sequence of the one or more DMRS scrambling sequences.

16. The network node of claim 12, wherein the low PAPR sequence generator is a Zadoff-Chu sequence generator.

17. The network node of claim 12, wherein the downlink MIMO communication is transmitted on a frequency that is greater than approximately 52 gigahertz (GHz).

18. The network node of claim 12, wherein the one or more processors are further configured to transmit a configuration that indicates the intra-slot DMRS pattern.

19. The network node of claim 18, wherein the configuration is transmitted via at least one of downlink control information (DCI), a medium access control (MAC) control element (CE), or radio resource control (RRC) signaling.

20. The network node of claim 18, wherein the one or more processors are further configured to transmit the configuration based at least in part on a determination that a characteristic of a channel associated with the downlink MIMO communication satisfies a threshold.

21. The network node of claim 12, wherein the DMRS is transmitted according to an inter-slot DMRS pattern that indicates one or more slots, of a plurality of slots of the downlink MIMO communication, in which the DMRS is to be transmitted.

22. The network node of claim 21, wherein the one or more processors are further configured to transmit a configuration that indicates the inter-slot DMRS pattern.

23. The network node of claim 22, wherein the configuration is transmitted via at least one of downlink control information (DCI), a medium access control (MAC) control element (CE), or radio resource control (RRC) signaling.

24. The network node of claim 22, wherein the one or more processors are further configured to transmit the configuration based at least in part on a determination that a characteristic of a channel associated with the downlink MIMO communication satisfies a threshold.

25. A method of wireless communication performed by a user equipment (UE), comprising:

determining one or more demodulation reference signal (DMRS) scrambling sequences using a low peak-to-average power ratio (PAPR) sequence generator,
wherein each DMRS scrambling sequence of the one or more DMRS scrambling sequences corresponds to a respective port of one or more ports, the one or more ports being associated with a downlink multiple input multiple output (MIMO) communication,
wherein the downlink MIMO communication is a discrete Fourier transform spread orthogonal frequency division multiplexing (DFT-s-OFDM)-based communication; and
receiving the downlink MIMO communication including a DMRS according to an intra-slot DMRS pattern,
wherein the intra-slot DMRS pattern indicates one or more time domain multiplexed symbols, each symbol of the one or more time domain multiplexed symbols being at least partially allocated with at least one DMRS scrambling sequence of the one or more DMRS scrambling sequences.

26. The method of claim 25, wherein the intra-slot DMRS pattern indicates that a symbol of the one or more time domain multiplexed symbols is partially allocated with a single DMRS scrambling sequence of the one or more DMRS scrambling sequences.

27. The method of claim 25, wherein the intra-slot DMRS pattern indicates that a symbol of the one or more time domain multiplexed symbols is fully allocated with a single DMRS scrambling sequence of the one or more DMRS scrambling sequences.

28. A method of wireless communication performed by a network node, comprising:

determining one or more demodulation reference signal (DMRS) scrambling sequences using a low peak-to-average power ratio (PAPR) sequence generator,
wherein each DMRS scrambling sequence of the one or more DMRS scrambling sequences corresponds to a respective port of one or more ports, the one or more ports being associated with a downlink multiple input multiple output (MIMO) communication,
wherein the downlink MIMO communication is a discrete Fourier transform spread orthogonal frequency division multiplexing (DFT-s-OFDM)-based communication; and
transmitting the downlink MIMO communication including a DMRS according to an intra-slot DMRS pattern,
wherein the intra-slot DMRS pattern indicates one or more time domain multiplexed symbols, each symbol of the one or more time domain multiplexed symbols being at least partially allocated with at least one DMRS scrambling sequence of the one or more DMRS scrambling sequences.

29. The method of claim 28, wherein the intra-slot DMRS pattern indicates that a symbol of the one or more time domain multiplexed symbols is at least partially allocated with a single DMRS scrambling sequence of the one or more DMRS scrambling sequences.

30. The method of claim 28, wherein the intra-slot DMRS pattern indicates that a symbol of the one or more time domain multiplexed symbols is fully allocated with a single DMRS scrambling sequence of the one or more DMRS scrambling sequences.

* * * * *